United States Patent
Gregorio et al.

(10) Patent No.: US 11,403,714 B1
(45) Date of Patent: Aug. 2, 2022

(54) SYSTEMS AND METHODS FOR ADJUSTING PREMIUM RATE BASED ON USAGE

(71) Applicant: United Services Automobile Association (USAA), San Antonio, TX (US)

(72) Inventors: Igor Alexandre Gregorio, San Antonio, TX (US); Eric John Ortiz, San Antonio, TX (US); Veronica Montemayor, San Antonio, TX (US); Jennifer Lynne Gravely, San Antonio, TX (US); Earl Sargent, San Antonio, TX (US); Fernando Sanzzi, San Antonio, TX (US); Mark Medeiros, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 17/030,019

(22) Filed: Sep. 23, 2020

Related U.S. Application Data

(63) Continuation of application No. 16/051,056, filed on Jul. 31, 2018, now Pat. No. 10,832,342.

(60) Provisional application No. 62/539,299, filed on Jul. 31, 2017.

(51) Int. Cl.
*G06Q 40/08* (2012.01)
*B60W 40/09* (2012.01)
*G07C 5/00* (2006.01)

(52) U.S. Cl.
CPC ............ *G06Q 40/08* (2013.01); *B60W 40/09* (2013.01); *G07C 5/008* (2013.01); *B60W 2556/10* (2020.02)

(58) Field of Classification Search
CPC ........ G06Q 40/08; B60W 40/09; G07C 5/008
See application file for complete search history.

(56) References Cited

U.S. PATENT DOCUMENTS

| 6,453,731 | B1 | 9/2002 | Yaegashi |
| 7,937,278 | B1 * | 5/2011 | Cripe ..................... G06Q 40/08 705/4 |
| 9,652,805 | B1 | 5/2017 | Clawson, II et al. |
| 2003/0040322 | A1 | 2/2003 | Lection et al. |
| 2013/0214919 | A1 | 8/2013 | Bassali |

(Continued)

FOREIGN PATENT DOCUMENTS

WO    WO-2014014478 A1 *  1/2014  ............. G10L 15/08

*Primary Examiner* — Scott C Anderson
(74) *Attorney, Agent, or Firm* — Fletcher Yoder, P.C.

(57) ABSTRACT

A system includes a vehicle system including one or more sensors that to monitor one or more properties related to an operation of a vehicle. The system also includes a processor that receives expected vehicle usage information from an applicant, a database, publicly available sources, or the like and receive a set of data including the one or more properties from the vehicle system. The set of data is associated with the expected vehicle usage information. The processor may then determine a premium base rate based at least in part on the set of data and a risk associated with the applicant and determine a vehicle rate based at least in part of the set of data and a risk associated with the vehicle. The processor may then display a visualization including the premium base rate and the vehicle rate on a display.

14 Claims, 4 Drawing Sheets

(56) References Cited

U.S. PATENT DOCUMENTS

| | | |
|---|---|---|
| 2013/0317665 A1 | 11/2013 | Fernandes et al. |
| 2014/0025440 A1* | 1/2014 | Nagda .................... G06Q 10/08 |
| | | 705/7.38 |
| 2014/0278837 A1* | 9/2014 | Blumer .............. G06Q 30/0283 |
| | | 705/13 |
| 2015/0120331 A1* | 4/2015 | Russo .................... G06Q 40/08 |
| | | 705/4 |
| 2015/0187016 A1 | 7/2015 | Adams et al. |
| 2017/0021764 A1 | 1/2017 | Adams et al. |
| 2017/0109827 A1* | 4/2017 | Huang .................... G07C 5/008 |
| 2017/0144671 A1* | 5/2017 | Memani ............. G06Q 10/1053 |
| 2017/0234689 A1 | 8/2017 | Gibson et al. |

\* cited by examiner

SYSTEMS AND METHODS FOR ADJUSTING PREMIUM RATE BASED ON USAGE

CROSS REFERENCE TO RELATED APPLICATIONS

This is a continuation to U.S. patent application Ser. No. 16/051,056, filed Jul. 31, 2018, which claims priority to U.S. Provisional Application No. 62/539,299, filed Jul. 31, 2017, the entire contents of which is hereby incorporated by reference in its entirety for all purposes.

BACKGROUND

The present disclosure relates generally to systems and methods for generating insurance premium rates. It is now recognized that improved techniques are desirable for providing personal variable insurance premium rates.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a vehicle system including one or more sensors that to monitor one or more properties related to an operation of a vehicle. The system also includes a processor that receives expected vehicle usage information from an applicant, a database, publicly available sources, or the like and receives a first set of data including the one or more properties from the vehicle system. The first set of data is associated with the expected vehicle usage information. The processor may then determine a premium base rate based at least in part on the first set of data and a risk associated with the applicant and determine a vehicle rate based at least in part of the first set of data and a risk associated with the vehicle. The processor may then display a first visualization including the premium base rate and the vehicle rate on a display.

In another embodiment, a method includes receiving, via a processor, expected vehicle usage information from an applicant, a database, publicly available sources, or the like. The method may then involve receiving, via the processor, a first set of data including one or more properties related to an operation of a vehicle from a vehicle system of a vehicle, such that the first set of data is associated with the expected vehicle usage information. The method may also involve determining, via the processor, a premium base rate based at least in part on the first set of data and a risk associated with the applicant and a vehicle rate based at least in part on the first set of data and a risk associated with the vehicle. The method may then include displaying a first visualization including the premium base rate and the vehicle rate via a display.

In another embodiment, a system may include a vehicle system having data related to one or more properties of a vehicle. The one or more properties may include a vehicle type, a vehicle make, a vehicle model, an amount of miles driven, a location of travel, and a frequency of travel of a vehicle. The system also includes a processor that receives expected vehicle usage information from an applicant, a database, publicly available sources, or the like. The processor may receive a first set of data including the one or more properties, such that the first set of data is associated with the expected vehicle usage information. The processor may then determine a premium base rate based at least in part on the expected vehicle usage information and the first set of data and determine a vehicle rate based at least in part on the expected vehicle usage information and the first set of data. The vehicle rate may include a vehicle base rate and a vehicle per mile rate. The processor may then display a first visualization including the premium base rate and the vehicle rate on a display. The processor may also receive a second set of data after the first set of data is received, such that the second set of data includes an updated amount of miles driven by the vehicle. The processor may then determine an invoice for a billing period based on the premium base rate, the vehicle rate, and the second set of data, and display a second visualization including the invoice via the display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
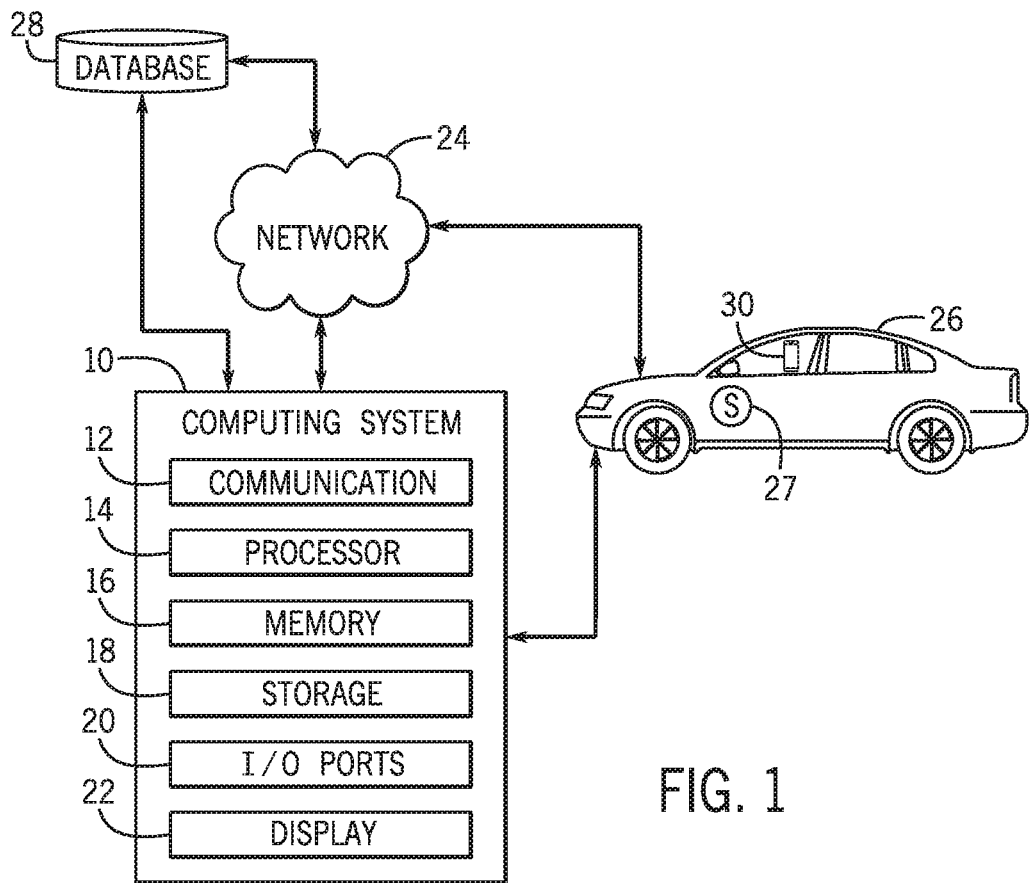
FIG. 1 illustrates a block diagram of a computing system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Insurance premium rates are commonly determined on a semi-annual or annual basis for any applicant based on certain information regarding the applicant and the type of coverage that the applicant is seeking. For instance, when determining a vehicle insurance premium rate for an applicant, a computing system may analyze a driving record of the applicant, information regarding the vehicle being insured, and the like. Using this information, the computing system may generate an annual premium rate typically to be paid in equal installments throughout the year (e.g., monthly).

However, it is presently recognized that many insurance customers may wish for their premium rates to be based on their personal transportation needs. With this in mind, insurance customers may be intrigued to obtain vehicle insurance through an insurance provider that is capable of providing an insurance rate that is based on their personal transportation habits and vehicle usage. A more flexible and personal framework for vehicle insurance rate determination may enable coverage that scales up and down to cover the individual customer's transportation needs and usage. This may enable insurance customers more control over the cost of their vehicle insurance premium rates and recurring payments. To assist insurance providers in providing competitive rates based on transportation habits or behavior (e.g., lifestyle) and usage, computing systems in accordance with present embodiments may determine a base rate and vehicle rate based on data regarding the applicant via vehicle sources to confirm a risk level and basic usage level associated with the applicant, as well as monitor vehicle usage by the applicant throughout billing periods.

In addition, computing systems in accordance with present embodiments may monitor transportation habits and usage to provide incentives that encourage safe driving behavior. That is, the monitored parameters, in some embodiments, may be used by computing systems to determine or attribute discounts for certain individuals. Additional details regarding systems and techniques for generating personal variable vehicle insurance rates and discounts will be discussed below with reference to FIGS. 1-7. Although the system is described as determining a base rate and/or a vehicle rate, it should be understood that the present disclosure is applicable to determining a discount or other financial incentives based on transportation habits, behavior, and usage of the applicant.

By way of introduction, FIG. 1 is a block diagram of a computing system 10 communicatively coupled to a variety of data sources that may assist the computing system 10 in determining rates for vehicle insurance policies. The computing system 10 may include any suitable computer device, such as a general-purpose personal computer, a laptop computer, a tablet computer, a mobile computer, and the like. The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, and the like. The communication component 12 may be a wireless or wired communication component that may facilitate communication between the computing system 10 and various other computing systems via a network, the Internet, or the like.

The processor 14 may be any type of computer processor or microprocessor capable of executing computer-executable code. The processor 14 may also include multiple processors that may perform the operations described below.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples and the computing system 10 may include additional or fewer components relative to the illustrated embodiment.

In certain embodiments, the computing system 10 may be communicatively coupled to a network 24, which may include collections of computing systems, the Internet, an Intranet system, or the like. The network 24 may facilitate communication between the computing system 10 and various other data sources. For instance, the network 24 may be communicatively coupled to a vehicle system 26. In some embodiments, the network 24 may also be communicatively coupled to one or more databases 28, which may store data regarding individuals such as, driving records, credit information, banking information, and other information that may be publicly available regarding the individuals and relevant for obtaining vehicle insurance. In addition, the database 28 may include an exposed application programming interface (API) that provides data services regarding the individual's vehicle use.

Referring back to the vehicle system 26 (which may be integrated with or include a vehicle), in certain embodiments, the vehicle system 26 may monitor the operation of the vehicle. For instance, the vehicle system 26 may monitor the locations of the vehicle, frequency of use of the vehicle, times at which the vehicle is in use, the mileage driven by the vehicle, and the like. To track this information, the vehicle system 26 may include similar components as the computing system 10 described above. In addition, the vehicle system 26 and/or the computing system 10 may be communicatively coupled to various sensors 27 or devices within the vehicle to acquire data regarding the operation of the vehicle. By way of example, the vehicle system 26 may be communicatively coupled to a global positioning system (GPS) of the vehicle, an odometer of the vehicle, and other sensors that may provide information regarding the operation or location of the vehicle. In some embodiments, the vehicle system 26 may be communicatively coupled to other computing systems such as mobile devices 30, including mobile phones, tablet devices, and the like to monitor the usage of these devices during the operation of the vehicle.

Although the vehicle system 26 and the database 28 are described as being communicatively coupled to the computing system 10 via the network 24, it should be noted that, in other embodiments, the vehicle system 26 and the database 28 may be communicatively coupled directly to the computing system 10.

Figure 2:
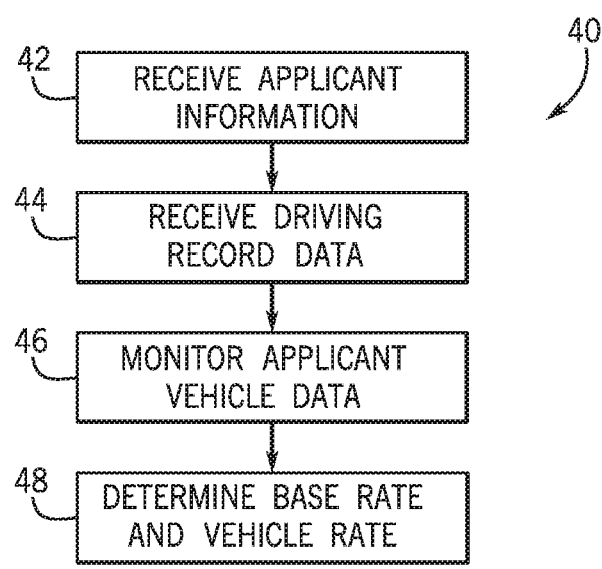
FIG. 2 illustrates a flow chart of a method for determining a base rate and a vehicle rate for a personal variable policy premium based on the data acquired from the data sources of FIG. 1, in accordance with embodiments described herein.

The computing system 10 may receive information from the applicant, network 24, vehicle system 26, database 28, mobile devices 30, or other sources, and may utilize the information to determine a personal variable insurance premium rate for the applicant. With the foregoing in mind, FIG. 2 illustrates a flow chart of a method 40 for determining a base rate and a vehicle rate for a personal variable premium rate based on the data acquired from the vehicle system 26, the database 32, and the like. In general, the computing system 10 may receive information regarding an applicant for vehicle insurance, receive data regarding the applicant's behavior associated with usage of a vehicle, and determine the base rate and the vehicle rate for a personal variable premium rate. The personal variable premium rate may be a rate the applicant may pay for the insurance policy that may fluctuate in amount based on the applicant's vehicle usage. As mentioned above, the personal variable premium rate may include a base rate and a vehicle rate. The base rate of the personal variable premium rate may be a minimum amount for coverage under the personal variable premium insurance plan. The base rate may be based on a risk value associated with the applicant, considering transportation habits and general vehicle usage. The vehicle rate of the personal variable premium rate may include a vehicle base rate and a vehicle per mile rate. The vehicle base rate may be a minimum amount for coverage of the vehicle and may be based on a risk value associated with the vehicle. The vehicle per mile rate may be a rate per mile driven in the vehicle per billing period and may be based on the risk associated with the vehicle.

Although the method 40 is described in a particular order, it should be noted that the method 40 may be performed in any suitable order and is not limited to the order presented herein. It should also be noted that although each block is described below in the method 40 as being performed by the computing system 10, other suitable computing systems may perform the methods described herein.

Referring now to FIG. 2, at block 42, the computing system 10 may receive applicant information regarding the individual seeking insurance. The applicant information may be received from such sources as the applicant, the database 28, social media, or other publicly available sources that may provide information about the applicant that may be used in obtaining vehicle insurance. The applicant information may include information relevant to an insurance provider for providing vehicle insurance. For example, the applicant information may include lifestyle information or information concerning transportation habits, such as the applicant's occupation and expected vehicle usage (e.g., driving to work). The applicant information may also include information related to the vehicle owned by the applicant for which the applicant seeks coverage. For example, the applicant information may include information related to the number of vehicles owned by the applicant, the type of vehicle(s), a make of the vehicle(s), a model of the vehicle(s), a condition of the vehicle(s), and the like. Such applicant information may enable the computing system 10 to determine a risk level associated with the applicant based on the applicant's vehicle and general frequency of usage. The risk level may be used by the computing system 10 in determining the base rate and vehicle rate for the applicant's personal variable vehicle insurance premium rate.

In some embodiments, at block 44, after receiving the applicant information, the computing system 10 may receive driving record data associated with the applicant. The driving record data may be received from such sources as the applicant, the database 28, social media, or other publicly available sources that may provide information about the applicant that may be used in obtaining vehicle insurance. The driving record data may include information regarding previous accidents that the applicant was associated with, citations received for vehicle operation, and the like. In certain embodiments, the driving record data may be received via the database 28. In certain embodiments, the applicant may provide this information to the computing system 10 via a web-based application, a device coupled to the I/O ports 20, or the like. The driving record data may be used in determining the risk level associated with the applicant.

In certain embodiments, the applicant may seek insurance coverage for more than one driver. In such embodiments, the applicant information, including information regarding expected vehicle usage by each driver and vehicle information for each vehicle, may be received by the computing system 10 for each applicant (e.g., driver).

After receiving the data discussed above, the computing system 10 may begin monitoring vehicle data at block 46 for a certain period of time. As such, the computing system 10 may receive data from the vehicle system 26 for some period of time. This initial monitoring of the vehicle data by the computing system 10 may assist the computing system 10 to verify whether the data provided by the applicant is accurate. In one embodiment, after receiving the data at blocks 42 and 44, the computing system 10 may assess a risk value or score applied to the applicant for vehicle insurance. The risk value may directly relate to the base rate and the vehicle rate of the applicant's personal variable premium rate. By monitoring the applicant's activities for a period of time, the computing system 10 may be capable of better assessing whether the risk value attributed to the applicant is accurate. For instance, if the applicant indicates that he works from home and does not drive regularly on weekdays and the computing system 10 receives data from the vehicle system 26 that indicates that the applicant regularly drives on weekdays, the computing system 10 may adjust the initial risk level determined for the applicant based on the applicant's true vehicle usage. As another example, if the applicant indicates that he regularly drives to work every weekday and the computing system 10 receives data from the vehicle system 26 that indicates that while the applicant regularly drives to work on weekdays, the applicant travels to and from work at times of the day that are during off-peak or light traffic hours, the computing system 10 may adjust the initial risk level determined for the applicant based on the applicant's true vehicle usage.

After monitoring the vehicle data via the vehicle system 26 for the defined amount of time, at block 48, the computing system 10 may determine a base rate and a vehicle rate for vehicle insurance for the applicant. As such, the computing system 10 may use the data acquired from blocks 42, 44, and 46 to assess a risk value to insure the applicant, which may be associated with the base rate and the vehicle rate. The base rate and the vehicle rate may refer to rates that remain the same as long as the applicant's lifestyle and vehicle remain the same. As previously discussed, the base rate may be a minimum amount of coverage under the personal variable premium rate and may be based on the risk value associated with the applicant, considering lifestyle and general usage received from the applicant and monitored by the computing system 10 for the defined period of time. The vehicle rate may include both a vehicle base rate and a vehicle per mile rate, each based on the risk value associated with the applicant's vehicle. By determining the base rate and vehicle rate based on the applicant's vehicle and usage of the vehicle in their lifestyle, the personal variable premium rate provided herein may enable transparency to the applicant and enable the applicant increased flexibility in controlling their premium cost and monthly bill.

After determining the base rate and the vehicle rate of the personal variable premium rate, the computing system 10 may continue to monitor the vehicle usage via the vehicle system 26. That is, the computing system 10 may continue receiving data from the vehicle system 26 to determine a per mile rate, as discussed in detail with reference to FIG. 3. In some embodiments, after determining the base rate and the vehicle rate, the computing system 10 may also send a notification via an electronic service, such as text or email, indicating the base rate and the vehicle rate to a computing system associated with the applicant. As such, the applicant may receive information regarding the determined base rate and vehicle rate for the personal variable premium rate via a visualization presented on a display or by other suitable means.

Figure 3:
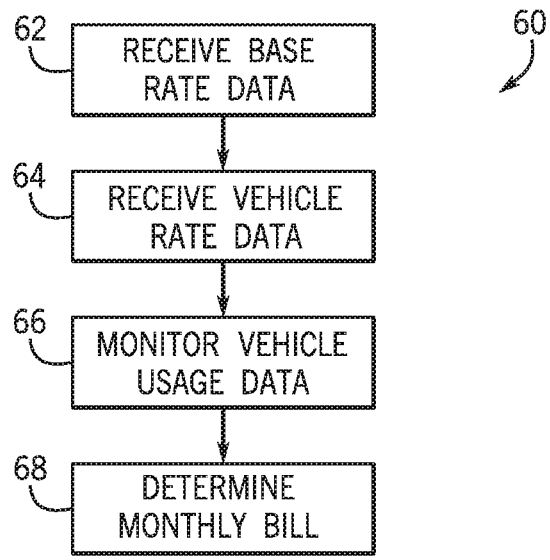
FIG. 3 illustrates a flow chart of a method for determining an invoice for a billing period based on the base rate and vehicle rate determined according to the method of FIG. 2 and acquired mileage data, in accordance with embodiments described herein.

FIG. 3 illustrates a flow chart of a method 60 for determining an invoice for a billing period of the personal variable insurance premium rate. After the base rate and the vehicle rate have been determined, as described in the method 40 of FIG. 2, the computing system 10 may continue to monitor the vehicle data via the vehicle system 26. In general, the computing system 10 may receive the vehicle data regarding the applicant's vehicle usage for a particular billing period and determine a billing invoice for the billing period. Although the billing period is described as a rate per month, it should be understood that the present disclosure is applicable to other suitable billing periods (e.g., bi-weekly, quarterly, yearly). It should also be noted that each block described below in the method 60 may be performed by the computing system 10.

Referring now to FIG. 3, at blocks 62 and 64, respectively, the computing system 10 may receive or recall the base rate and the vehicle rate determined in the method 40 of FIG. 2 for the applicant. As previously discussed, the base rate may be based on the risk value associated with the applicant, considering lifestyle and general usage, and the vehicle rate may include both the vehicle base rate and the vehicle per mile rate, each based on the risk value associated with the applicant's vehicle. The billing invoice for the applicant's billing period may be determined based on the base rate, the vehicle rate, and a number of miles driven during the billing period.

At block 66, after receiving or recalling the base rate and vehicle rate determined for the applicant, the computing system 10 may monitor the vehicle data via the vehicle system 26. As previously discussed, the computing system 10 may continue to monitor the applicant after the computing system 10 has determined the base rate and vehicle rate for the applicant's personal variable premium rate. Thus, at block 66, the computing system 10 may receive vehicle usage data via the vehicle system 26. The vehicle data received may include data indicating a mileage driven (e.g., amount of miles driven) by the applicant in the vehicle during the monthly billing period.

At block 68, the computing system 10 may determine a billing invoice for the monthly billing period being monitored. The computing system 10 may determine the period billing invoice based on the base rate, the vehicle rate, and the mileage driven by the applicant in the vehicle for the monthly period. For example, the computing system 10 may have determined a base rate for the applicant of $32.10 per month and a vehicle rate for the applicant's vehicle of $30.00 per month and $0.10 per mile. If the computing system 10 receives data from the vehicle system 26 indicating that the applicant drove 60 miles in the vehicle for the monthly billing period being monitored (e.g., current monthly billing period), the computing system 10 may determine the applicant's monthly bill for that particular monthly billing period to be $68.10 (base rate+vehicle monthly rate+[vehicle per mile rate×miles driven]).

In some embodiments, the computing system 10 may determine and apply certain incentive discounts on the applicant's billing period invoice or provide ride-sharing coupons if the computing system 10 receives data indicating that the applicant frequently uses ride-sharing applications. The computing system 10 may receive data indicating that the applicant frequently uses ride-sharing application from mobile devices 30 associated with the applicant. For example, the computing system 10 may detect usage of ride-sharing applications via the applicant's mobile device 30 or may detect multiple unrelated mobile devices in an unrelated vehicle. In some embodiments, the computing system 10 may receive data directly from ride-sharing applications or from the network 24 indicating use of ride-sharing applications by the applicant. Further, in some embodiments, the computing system 10 may receive data indicating times of usage of ride-sharing applications by the applicant and frequency of usage of ride-sharing applications by the applicant. In some embodiments, higher frequency of usage and/or usage during peak travel hours or other times at which accidents occur at a higher frequency may result in larger discounts on the applicant's billing period invoice or better ride-sharing coupons. Further, in some embodiments, the ride-sharing usage data may be used in adjusting the applicant's base rate.

In some embodiments, after determining the applicant's billing period invoice, the computing system 10 may also send a notification via an electronic service, such as text or email, indicating the previous month's invoice or bill to a computing system associated with the applicant. As such, the applicant may receive information regarding the billing period invoice for the personal variable premium rate via a visualization presented on a display or by other suitable means. In some embodiments, the computing system 10 may update the visualization of the billing period invoice in real-time based on the monitoring of the vehicle data. In some embodiments, if the applicant is obtaining coverage for more than one vehicle and/or applicant (e.g., driver), the billing period invoice for each vehicle may be determined using the method 60. Additionally, each billing period invoice may be presented to the applicant on the display or other suitable means individually, in a consolidated manner, or a combination thereof. Details regarding an example display of the determined billing period invoice (e.g., monthly premium) will be discussed below with reference to FIG. 5.

Figure 4:
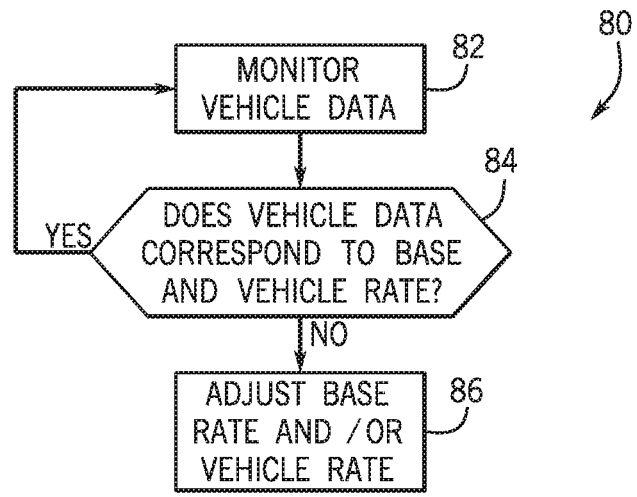
FIG. 4 illustrates a flow chart of a method for adjusting the base rate and/or the vehicle rate determined according to the method of FIG. 2, in accordance with embodiments described herein.

FIG. 4 illustrates a flow chart of a method 80 for adjusting the base rate and/or vehicle rate of the personal variable premium rate based on analysis of vehicle data received from the vehicle system 26. As previously discussed, the computing system 10 may continuously monitor the vehicle data via data received from the vehicle system 26. At block 82, the computing system 10 may receive vehicle data from the vehicle system 26. The vehicle data may include, for example, data regarding mileage the vehicle travels and data regarding frequency and location of travel of the vehicle.

At block 84, the computing system 10 may determine whether the received vehicle data corresponds to the base rate and vehicle rate set for the personal variable premium rate. For instance, the base rate may be set for the applicant who drives 15 miles to and from work each day. If the vehicle data does not correspond to the determined base rate expectation, the computing system 10 may proceed to block 86 and adjust the base rate accordingly. Alternatively, if the vehicle data does correspond to the base rate expectation, the computing system 10 may return to block 82 and continue to monitor the driving activity of the applicant.

As another example, the vehicle rate, including the vehicle base rate and the vehicle per mile rate, may vary for different vehicles based on associated risks. A vehicle that carries more risk may include a high performance vehicle, a vehicle with relatively more expensive parts, or a vehicle that is associated with a higher risk profile. If the vehicle data received from the vehicle system 26 does not correspond to the determined vehicle rate, the computing system 10 may proceed to block 86 and adjust the vehicle rate accordingly. Alternatively, if the vehicle data does correspond to the vehicle rate expectation, the computing system 10 may return to block 82 and continue to monitor the vehicle data of the applicant. The computing system 10 may determine that the vehicle data does or does not correspond to the determined vehicle rate, for example, if an average gas mileage received from the vehicle system 26 does or does not correspond to an expected mileage by a particular percentage (e.g., 10%, 15%, 20%). As another example, the computing system 10 may determine that the vehicle data does or does not correspond to the determined vehicle rate if acceleration data received from the vehicle system 26 does or does not correspond to an expected acceleration rate. As such, the computing system 10 may use any vehicle data received from the vehicle system 26 that may indicate the vehicle type, make, model, or condition to determine if the vehicle data corresponds to the determined vehicle rate.

In some embodiments, the base rate and/or the vehicle rate may be adjusted based on data received by the computing system 10 directly from the applicant. For instance, if the applicant buys a new vehicle or if the applicant begins working at a new job where their driving distance and/or frequency changes, the computing system 10 may receive vehicle or lifestyle change information input by the applicant. The computing system 10 may then determine the base rate and vehicle rate for the personal variable premium rate based on the received lifestyle and vehicle data described above.

It should be noted that when the computing system 10 determines whether the received vehicle data corresponds to the expected values according to the base rate and vehicle rate, the computing system 10 may perform similar processes as described above with respect to FIG. 2. That is, the processes described above for determining the base rate and the premium rate may also be employed to provide real-time adjustments to the base rate and/or vehicle rate with respect to the method 80.

In some embodiments, after adjusting the base rate and/or the vehicle rate, the computing system 10 may also send a notification via an electronic service, such as text or email, indicating the adjusted base rate and/or the adjusted vehicle rate to a computing system associated with the applicant. As such, the applicant may receive information regarding the adjusted base rate and/or adjusted vehicle rate for the personal variable premium rate via a visualization presented on a display or by other suitable means. The computing system 10 may send a notification via text message, e-mail message, a visualization depicted on a mobile computing device (e.g., mobile device 30), or the like. In addition, the notification may also be presented via a display within the vehicle, coupled to the vehicle system 26, and the like. As such, the applicant may receive real-time rate updates while driving the vehicle via a display disposed within the vehicle.

In some embodiments, the computing system 10 may update the database 28 or some storage device that stores information regarding a relationship between applicant data received at block 42 of FIG. 2 as compared to monitored data received at block 46 of FIG. 2 and block 82 of FIG. 4. The relationship may include how the base rate and/or vehicle rate is adjusted based on particular changes in the applicant's transportation habits, behavior, usage, and/or vehicle. The computing system 10 may use the relationship data to better determine the base rate and the vehicle rate of the personal variable premium rate for other individuals that provide similar data.

Figure 5:
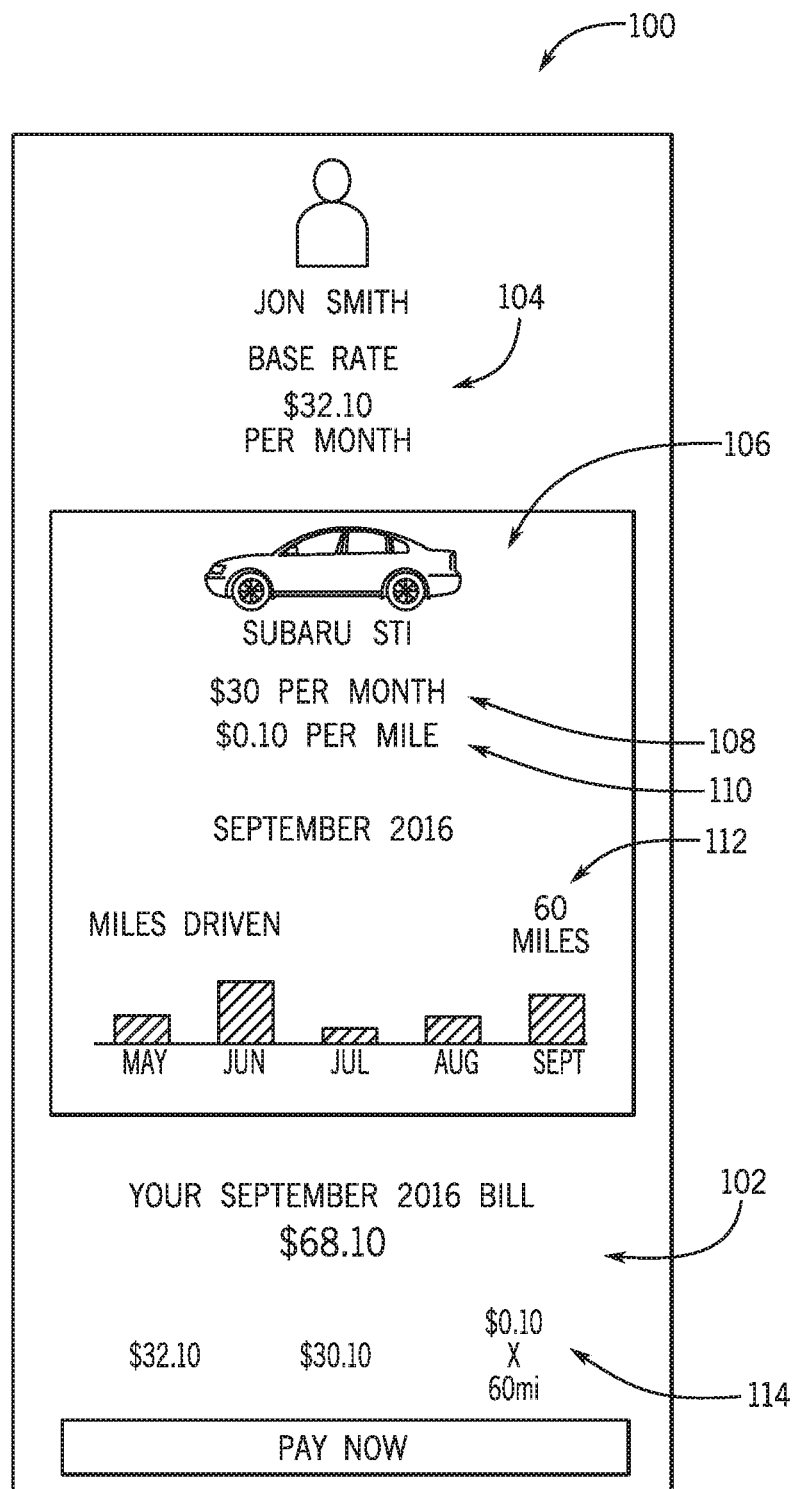
FIG. 5 illustrates an example visualization of a current billing period invoice of a personal variable rate policy premium that may vary based on vehicle data acquired from data sources of FIG. 1, in accordance with embodiments described herein.

FIG. 5 illustrates an example visualization 100 indicating a current billing period invoice 102 of the personal variable premium rate for the applicant. In addition to the current billing period invoice 102, the visualization 100 may display a current base rate 104, a current vehicle rate 106, including a vehicle base rate 108 and a vehicle per mile rate 110, and a mileage driven 112 that correspond to a rate formula 114 for determining the billing period invoice 102. The visualization 100 may be viewed by the application via a mobile computing device (e.g., mobile device 30), a display within the vehicle, or other computing device.

The visualization 100 may display the personal variable premium rate for the applicant as the billing period invoice 102. As previously discussed, the computing system 10 may determine the billing period invoice 102 based on the current base rate 104, the current vehicle rate 106, and the mileage driven in the vehicle for the billing period. The current vehicle rate 106 may be displayed as the vehicle base rate 108 and the vehicle per mile rate 110.

The visualization 100 may enable the applicant to view the current base rate 104 and the current vehicle rate 106 of their personal variable premium rate. The visualization 100 may further display the current mileage 112 driven by the vehicle for the current billing period. The computing system 10 may update the mileage 112 in real-time based on the vehicle data received from the vehicle system 26. In some embodiments, the visualization 100 may display vehicle usage (e.g., mileage 112) for previous billing periods, as shown in the illustrated embodiment, enabling the applicant to compare their vehicle usage and make informed decisions about their vehicle coverage and vehicle usage in the future. In some embodiments, the mileage 112 may be displayed as a bar graph or other suitable indication. The bar graph may include a bar representing the mileage 112 driven in the current billing period. The bar for the current billing period may grow as the billing period progresses and as the vehicle is driven throughout the billing period. The bar graph may also include one or more bars representing mileage 112 driven in previous billing periods. The bar graph of the visualization 100 may enable the applicant to compare driving habits and monthly billing invoices between different billing periods and enable increase control over monthly cost based on driving habits.

In some embodiments, the visualization 100 may include a billing invoice formula 114 that the computing system 10 may use to determine the currently billing period invoice 102, as discussed in FIG. 3. The billing invoice formula 114 may include the current base rate 104, the current vehicle base rate 108, the current vehicle per mile rate 110, and the current mileage driven 112. If the computing system adjusts the base rate or the vehicle rate, as discussed in FIG. 4, the computing system 10 may also update the visualization 100 to indicate such adjustments. Additionally, the computing system 10 may update the current mileage driven 112 and the current billing period invoice 102 in real-time based on monitoring of the vehicle data, as discussed in FIG. 3.

Figure 6:
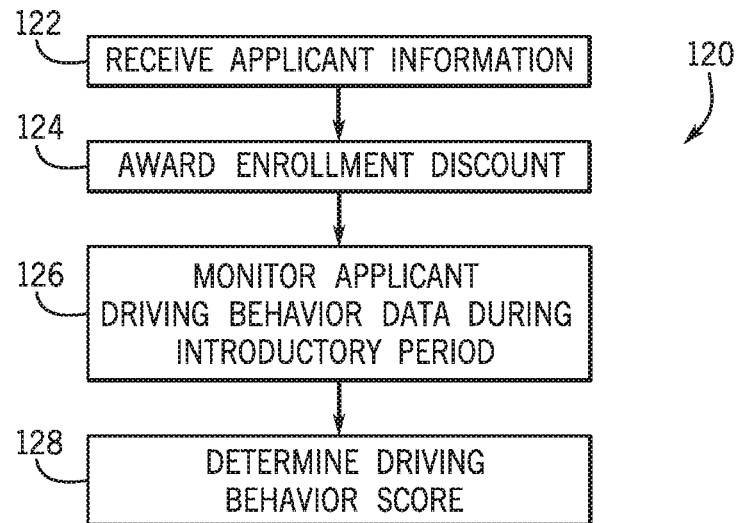
FIG. 6 illustrates a flow chart of a method for determining a discount for a personal variable policy premium based on the data acquired from the data sources of FIG. 1, in accordance with embodiments described herein.

As mentioned above, in addition to providing different rates, the presently disclosed techniques may be employed to provide discount incentives for drivers. For example, FIG. 6 illustrates a flow chart of a method 120 for determining a driving behavior score that may correspond to a discount for a personal variable premium rate based on data acquired from the vehicle system 26, the mobile device 30 associated with the applicant, or both. In general, the computing system 10 may receive information regarding an applicant for vehicle insurance enrollment, receive data regarding the applicant's behavior associated with usage of a vehicle, and determine a driving behavior score (e.g., risk value) corresponding to a personal variable premium rate discount. The personal variable premium rate discount may be a percentage of the underlying base rate or premium rate that may be discounted from the underlying rate. The personal variable premium rate discount may fluctuate in value based on the applicant's driving behavior and/or vehicle usage. The personal variable premium rate discount may be based on a driving behavior score associated with the applicant, considering certain behaviors during vehicle usage.

Although the method 120 is described in a particular order, it should be noted that the method 120 may be performed in any suitable order and is not limited to the order presented herein. It should also be noted that although each block is described below in the method 120 as being performed by the computing system 10, other suitable computing systems may perform the methods described herein.

Referring now to FIG. 6, at block 122, the computing system 10 may receive applicant information regarding the individual seeking insurance or enrollment. The applicant information may be received from such sources as the applicant, the database 28, social, or other publicly available sources that may provide information about the applicant that may be used in obtaining vehicle insurance. The applicant information may be used, in conjunction with driving behavior data associated with the applicant, to determine the driving behavior score.

In certain embodiments, the applicant may seek insurance coverage for more than one driver. In such embodiments, the applicant information may be received by the computing system 10 for each applicant (e.g., driver). In certain embodiments, eligibility of the applicant for the personal variable premium rate discount may be based on seeking insurance coverage for a majority or all of the drivers in the household.

In some embodiments, at block 124, after receiving the applicant information, the computing system 10 may award the applicant an automatic enrollment discount during an introductory period. The automatic enrollment discount may be a relatively low discount, such as a 5% discount. The introductory period may be a certain period of time in which the applicant may become familiar with the fluctuation of the personal variable premium rate discount based on the applicant's driving behavior monitored via the computing system 10 and how certain driving behavior may impact the applicant's driving behavior score and associated personal variable premium rate discount. In certain embodiments, the introductory period may be approximately two weeks or other suitable period of time.

After receiving the applicant information discussed above and awarding the automatic enrollment discount, the computing system 10 may begin monitoring data at block 126 for the introductory period of time. As such, the computing system 10 may receive data from the mobile device 30 associated with the applicant and/or the vehicle system 26. This initial monitoring of the driving behavior data may assist the computing system 10 to verify whether the data provided by the applicant is accurate and to monitor the driving behavior of the applicant. After monitoring the driving behavior data via the mobile device 30 and/or the vehicle system 26 for the defined introductory period of time, at block 128, the computing system 10 may determine a driving behavior score for the applicant, which may be used to determine the personal variable premium rate discount for the applicant. As such, the computing system 10 may use the data acquired from blocks 122 and 126 to assess a risk value to insure the applicant that may be associated with the driving behavior score and the corresponding personal variable premium rate discount. As previously discussed, the personal variable premium rate discount may be a percentage of the underlying base rate or premium rate that may be discounted based on the driving behavior data. By determining the driving behavior score and corresponding personal variable premium rate discount based on the applicant's driving behavior and usage of the vehicle, the personal variable premium rate discount provided herein may enable transparency to the applicant and enable the applicant increased flexibility in controlling their premium cost and monthly bill.

After determining the driving behavior score after the introductory period, the computing system 10 may continue to monitor the vehicle usage and driving behavior via the mobile device 30 and/or the vehicle system 26. That is, the computing system 10 may continue receiving data from the mobile device 30 and/or the vehicle system 26 to adjust the driving behavior score to correspond to the driving behavior and vehicle usage of the applicant. The driving behavior score and the corresponding personal variable premium rate discount may be locked at a value and corresponding percentage near a renewal time for the applicant's premium rate. As such, the computing system 10 may continue to monitor the vehicle usage and driving behavior data and adjust the driving behavior score and corresponding personal variable premium rate discount until a renewal event is within some amount of time (e.g., a threshold amount of time), as discussed in detail with reference to FIG. 7. The renewal event may occur every few months, such as every 3 months, 6 months, 12 months, and, in some embodiments, the period between renewal events may be variable. In certain embodiments, the driving behavior score and the corresponding personal variable premium rate discount may adjusted and locked at a value and corresponding percentage near the end of each billing period or when each bill is determined.

In some embodiments, after determining and/or adjusting the driving behavior score and the corresponding personal variable premium rate discount, including when the driving behavior score and the corresponding personal variable premium rate discount are locked, the computing system 10 may send a notification via an electronic service, such as a text or email, or may otherwise be displayed via the mobile device 30 or other computing system, indicating the driving behavior score and the corresponding personal variable premium rate discount associated with the applicant. As such, the applicant may receive information regarding the determined the driving behavior score and the corresponding personal variable premium rate discount via a visualization presented on a display or by other suitable means.

Figure 7:
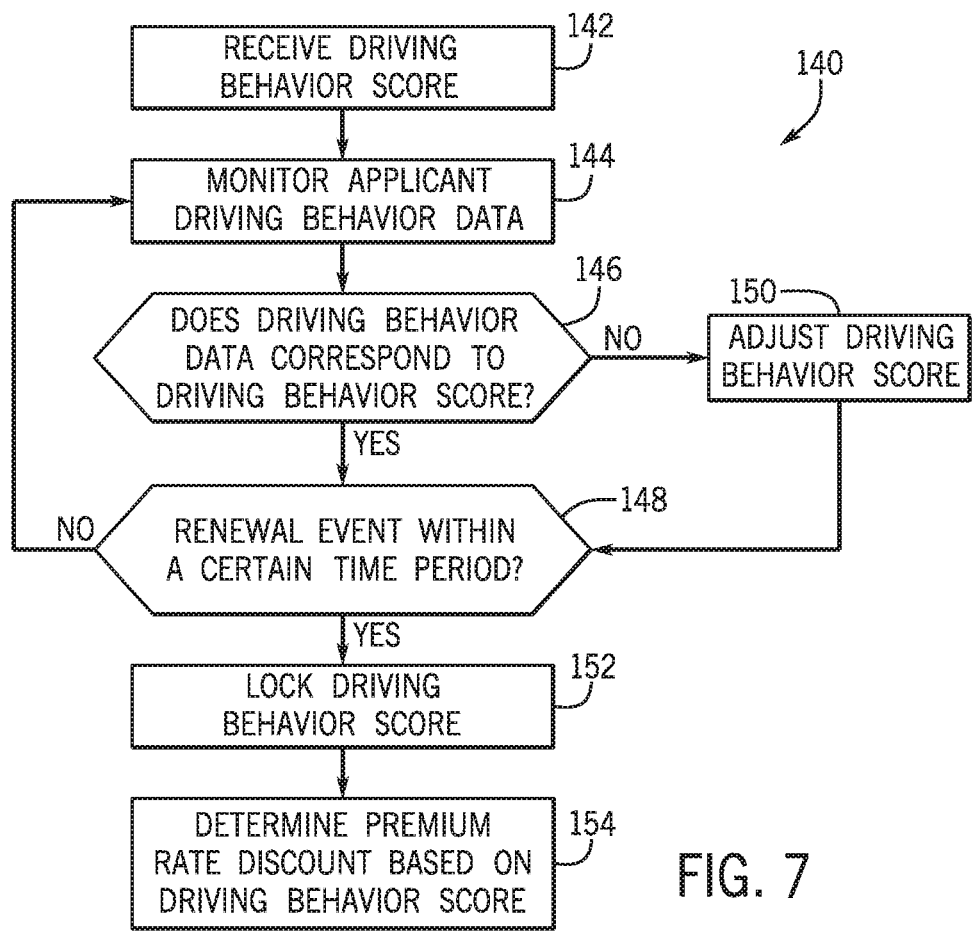
FIG. 7 illustrates a flow chart of a method for adjusting the discount determined according to the method of FIG. 6, in accordance with embodiments described herein.

In accordance with present embodiments, drivers may adjust their driving behavior when a renewal event is within a certain amount of time in order to increase their assessed discount. As such, in some embodiments, the computing system 10 may monitor the applicant's driving behavior data and adjust the associated driving behavior score even when a renewal event is not within a certain amount of time. Then the computing system 10 may lock the adjusted driving behavior score when a renewal event is within a certain amount of time (e.g., a threshold amount our time). To illustrate this, FIG. 7 is a flow chart of a method 140 for adjusting the driving behavior score and/or the corresponding personal variable premium rate discount based on analysis of driving behavior data and/or vehicle data received from the mobile device 30 and/or the vehicle system 26. As previously discussed, the computing system 10 may monitor the driving behavior data and/or vehicle data received from the mobile device 30 and/or the vehicle system 26. At block 142, the computing system 10 may receive the previously determined driving behavior score. At block 144, the computing system 10 may receive the driving behavior data from the mobile device 30 or other suitable device. The driving behavior data may include, for example, data indicating movement of the mobile device 30, quantity and length of phone calls taken using the handheld mobile device 30, quantity and length of phone calls taken using a hands-free mode, and harsh braking of the vehicle. This data may be measured using the mobile device 30. For example, movement of the phone and harsh braking of the vehicle may be measured via a flip flop or accelerometer associated with or integrated in the mobile device 30. In certain embodiments, the driving behavior score and the corresponding personal variable premium rate discount may be determined based only on the driving behavior data received from the mobile device 30. In certain embodiments, the driving behavior score and the corresponding personal variable premium rate discount may further be based on the vehicle data received from the vehicle system 26. The vehicle data may include, for example, data regarding mileage the vehicle travels and data regarding frequency and location of travel of the vehicle.

In some embodiments, the driving behavior score may be a score within a range, such as between 0 and 100, where a higher score correlates with less mobile device use while driving. A higher score may correlate with more mobile device use while driving. At block 146, the computing system 10 may determine whether the received driving behavior data corresponds to the driving behavior score. For instance, the driving behavior score may be set for the applicant who frequently engages with the mobile device 30 while driving. If the driving behavior data corresponds to the determined driving behavior score expectation, the computing system 10 may proceed to block 148. At block 148, the computing system 10 may determine whether a renewal event is approaching. Alternatively, if the driving behavior data does not correspond to the determined driving behavior score expectation at block 146, the computing system 10 may proceed to block 150 and adjust the driving behavior score accordingly. After the computing system 10 has adjusted the driving behavior score to correspond to the driving behavior data, the computing system 10 may proceed to block 148 and may determine whether a renewal event is approaching.

It should be noted that when the computing system 10 determines whether the received driving behavior data corresponds to the expected values according to the driving behavior score, the computing system 10 may perform similar processes as described above with respect to FIG. 6. That is, the processes described above for determining the driving behavior score may also be employed to provide real-time adjustments to the driving behavior score and the corresponding personal variable premium rate discount with respect to method 140.

At block 148, the computing system 10 may determine whether a renewal event is occurring within some time period. The computing system 10 may determine whether a renewal event is within the time period based on applicant information stored in the database 28. If a renewal event is not within the time period, the computing system 10 may return to block 144 and continue to monitor the driving behavior data of the applicant. If the computing system determines that a renewal event is within the time period, the computing system 10 may proceed to block 152 and may lock the current driving behavior score. After the driving behavior score is locked at block 152, the computing system 10 may determine the personal variable premium rate discount based on the driving behavior score. The personal variable premium rate discount may be a percentage discount off of the applicant's premium rate or base rate (e.g., 5%, 10%, 15%, 20%, 25%). The personal variable premium rate discount may range from 0% to approximately 25% based on the driving behavior score data, with a higher percentage discount may corresponding to a higher driving behavior score if a higher driving behavior score corresponds to less mobile device use while driving, or a higher percentage discount may correspond to a lower driving behavior score if a lower driving behavior score corresponds to less mobile device use while driving.

In some embodiments, after adjusting the driving behavior score at block 150 and/or after locking the driving behavior score and determining the personal variable premium rate discount at blocks 152 and 154, the computing system 10 may also send a notification via an electronic service, such as text or email, indicating the adjusted driving behavior score and/or locked driving behavior score and corresponding personal variable premium rate discount associated with the applicant. As such, the applicant may receive information regarding the adjusted and/or locked driving behavior score and/or personal variable premium rate discount via a visualization presented on a display or by other suitable means. The computing system 10 may send a notification via text message, email message, a visualization depicted on a mobile computing device (e.g., mobile device 30), or the like. In addition, the notification may also be presented via a display within the vehicle, coupled to the vehicle system 26, and the like. As such, the applicant may receive real-time score and discount updates while driving the vehicle via a display disposed within the vehicle.

In some embodiments, the computing system 10 may update the database 28 or some storage device that stores information regarding a relationship between applicant information received at block 122 of FIG. 6 as compared to monitored data received at block 126 of FIG. 6 and block 144 of FIG. 7. The relationship may include how the driving behavior score is adjusted based on particular changes in the applicant's mobile device and vehicle usage. The computing system 10 may use the relationship data to better determine the driving behavior score and the personal variable premium rate discount for other individuals that provide similar data.

Additionally, the monitored driving behavior data received via the mobile device 30 may be stored in the database 28 and may be accessible to the applicant through the computing system via the mobile device 30 or other computing system. As such, the applicant may be able to view the driving behavior data associated with each operation of the vehicle, including trips, drive start and stop times, any infractions along each trip, such as phone calls or other use of the mobile device while driving. Additionally, the driving behavior data may be displayed to the applicant via a map or other graphical representation.

The technical effects of the systems and methods described herein include using data acquired from various vehicle sensors to determine a base rate and a vehicle rate, or a discount, of a personal variable premium rate based on an applicant's lifestyle and vehicle usage, to monitor vehicle usage, and to adjust the base rate and vehicle rate in real-time based on changes in the applicant's transportation habits, behavior, usage, and/or vehicle. Providing an applicant with a transparent and flexible premium rate formula may enable the applicant to control the cost of their vehicle insurance and may enable the applicant to make informed decisions about their vehicle and vehicle usage.

Moreover, the present embodiments disclosed herein address post Internet problems such as using the data available via smart cars to provide sufficient insurance coverage for an applicant based specifically on the applicant's lifestyle and vehicle usage. Furthermore, the present embodiments improve the accuracy in determining an appropriate rate premium for vehicle insurance services by accounting for the vehicle usage of individual applicants, as opposed to classifying applicants in a general grouping of expected behavior. In addition, the present embodiments allow a user to view data regarding driving behavior and rates associated therewith in an efficient manner without having to navigate through various access points, websites, or the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system comprising:
a mobile device comprising one or more sensors configured to monitor one or more properties related to one or more operations of a vehicle; and
a processor configured to:
receive a first driving behavior score, wherein the first driving behavior score is associated with an applicant and corresponds to a first driving behavior data of the applicant, wherein the first driving behavior data was acquired over a first period of time;
receive a set of data comprising the one or more properties from the mobile device, wherein the set of data is indicative of a second driving behavior data of the applicant acquired over a second period of time;
determine if the second driving behavior data of the applicant corresponds to the first driving behavior score; and
in response to determining that the second driving behavior data of the applicant corresponds to the first driving behavior score:
determine that a renewal period for a premium rate for the applicant is within a threshold amount of time, wherein the premium rate comprises a fixed base rate and a vehicle rate, wherein the fixed base rate is determined based on a risk value associated with the first driving behavior data, and wherein the vehicle rate comprises a fixed vehicle base rate and a vehicle per mile rate;
lock the first driving behavior score as a driving behavior score to be used to determine a premium rate discount;
determine a premium rate discount based on the first driving behavior score, wherein the premium rate discount is configured to discount a portion of the premium rate for the applicant; and
send a notification configured to cause display of a visualization comprising the premium rate discount and the premium rate on a display coupled to the vehicle.

2. The system of claim 1, comprising one or more sensors configured to monitor one or more additional properties related to the operation of the vehicle, and wherein the processor is configured to receive an additional set of data comprising the one or more properties from the one or more sensors.

3. The system of claim 2, wherein the additional set of data is indicative of mileage of the vehicle, frequency of travel of the vehicle, or location of travel of the vehicle, or a combination thereof.

4. The system of claim 3, wherein the processor is configured to determine an invoice for a billing period based on the first driving behavior score and the premium rate discount, wherein the invoice comprises the premium rate, and wherein the set of data comprises an amount of miles driven for the billing period.

5. The system of claim 4, wherein the processor is configured to display a second visualization comprising the invoice via the display, wherein the second visualization comprises the set of data displayed as a bar graph, and wherein the bar graph comprises the amount of miles driven for a current billing period and one or more previous billing periods.

6. The system of claim 1, wherein the one or more properties are related to usage of the mobile device during the operation of the vehicle.

7. The system of claim 1, wherein the premium rate discount is a percentage between 0%-25%.

8. The system of claim 1, wherein the second driving behavior data includes data indicative of movement of the mobile device, quantity of phone calls using the mobile device, length of phone calls using a hands-free mode, or braking of the vehicle, or a combination thereof.

9. The system of claim 1, wherein the mobile device comprises an accelerometer.

10. The system of claim 1, wherein the processor is configured to:
   in response to determining that the second driving behavior data of the applicant corresponds to the second driving behavior score:
      assign the second driving behavior score to the applicant;
      determine that the renewal period for the premium rate for the applicant is within the threshold amount of time;
      lock the second driving behavior score as the driving behavior score to be used to determine the premium rate discount;
      determine a second premium rate discount based on the second driving behavior score; and
      send a second notification configured to cause display of an additional visualization comprising the second premium rate discount on the display.

11. A method performed by a processor, the method comprising:
   receiving a first driving behavior score, wherein the first driving behavior score is associated with an applicant and corresponds to a first driving behavior data of the applicant acquired over a first period of time, wherein the first driving behavior data is acquired over a first period of time;
   receiving a set of data comprising one or more properties related to one or more operations of a vehicle from a mobile device comprising one or more sensors configured to monitor the one or more properties in the vehicle, wherein the set of data is indicative of a second driving behavior data of the applicant acquired over a second period of time;
   determining if the second driving behavior data of the applicant corresponds to first driving behavior score; and
   in response to determining that the second driving behavior data of the applicant corresponds to first driving behavior score:
      determining that a renewal period for a premium rate for the applicant is within a threshold amount of time, wherein the premium rate comprises a fixed base rate and a vehicle rate, wherein the fixed base rate is determined based on a risk value associated with the first driving behavior data, and wherein the vehicle rate comprises a fixed vehicle base rate and a vehicle per mile rate;
      locking the first driving behavior score as a driving behavior score to be used to determine a premium rate discount;
      determining a premium rate discount based on the first driving behavior score, wherein the premium rate discount is configured to discount a portion of the premium rate for the applicant; and
      sending a notification configured to cause display of a visualization comprising the premium rate discount and the premium rate on a display coupled to the vehicle.

12. The method of claim 11, comprising:
   receiving an additional set of data from one or more sensors of a vehicle system, wherein the one or more sensors are configured to monitor one or more additional properties related to the operation of the vehicle.

13. The method of claim 12, comprising:
   determining an invoice for a billing period based on the first driving behavior score and the premium rate discount, wherein the invoice comprises the premium rate, and wherein the additional set of data comprises an amount of miles driven for the billing period.

14. The method of claim 13, comprising:
   sending a second notification configured to cause display of a second visualization comprising the invoice on the display, wherein the second visualization comprises the set of data displayed as a bar graph, wherein the bar graph comprises the amount of miles driven for a current billing period and one or more previous billing periods; and
   updating the second visualization in real-time.

\* \* \* \* \*